United States Patent [19]

Hamori

[11] Patent Number: 5,091,721
[45] Date of Patent: Feb. 25, 1992

[54] ACOUSTIC DISPLAY GENERATOR

[75] Inventor: Alfred S. Hamori, Huntington Beach, Calif.

[73] Assignee: Hughes Aircraft Company, Los Angeles, Calif.

[21] Appl. No.: 289,161

[22] Filed: Dec. 22, 1988

[51] Int. Cl.⁵ .............................................. G09G 5/00
[52] U.S. Cl. .................................... 340/727; 340/724
[58] Field of Search ............... 340/744, 747, 715, 727, 340/723, 724; 382/46

[56] References Cited

U.S. PATENT DOCUMENTS

| | | | |
|---|---|---|---|
| 4,560,981 | 12/1985 | Jackson et al. | 340/744 |
| 4,673,931 | 6/1987 | Cunningham et al. | 340/715 |
| 4,845,480 | 7/1989 | Satou | 340/744 |
| 4,862,150 | 8/1989 | Katsura et al. | 340/744 |

Primary Examiner—Jeffery A. Brier
Attorney, Agent, or Firm—W. K. Denson-Low

[57] ABSTRACT

A display generator (23) which converts acoustic sensor data stored in a bulk memory (19) into data which is displayed on a raster-type monitor. The display generator (23) provides for pixel processing and manipulation capabilities supported by a pixel formatter (65), a pixel mover (69), and an acoustic controller (57) with local memory (55). The display generator (23) converts acoustic data from a predetermined sensor format into a variety of display formats compatible with the raster-type monitor. The acoustic controller is a pixel build algorithm processor used to initialize and monitor the display generator (23) in real time. It provides for pixel address generation to construct the images in the bit mapped memory (25). The formatter (65) is an independent processor having its own controller and control algorithm processor which provides for parallel processing of the data in parallel with and independent from the operations of the pixel mover (69) and controller (57). Consequently, the display generator (23) provides for parallel pipelining of data from the bulk memory (19) to the bit mapped memory (25). The display generator (23) also permits rapid updates of the displayed image without reconstructing the entire image utilizing the pixel mover (69). The pixel mover (69) updates selected areas of the image stored in the bit mapped memory (25) by operating on multiple pixels at a time, in particular, multiple blocks of pixels comprising sixteen pixels each.

8 Claims, 12 Drawing Sheets

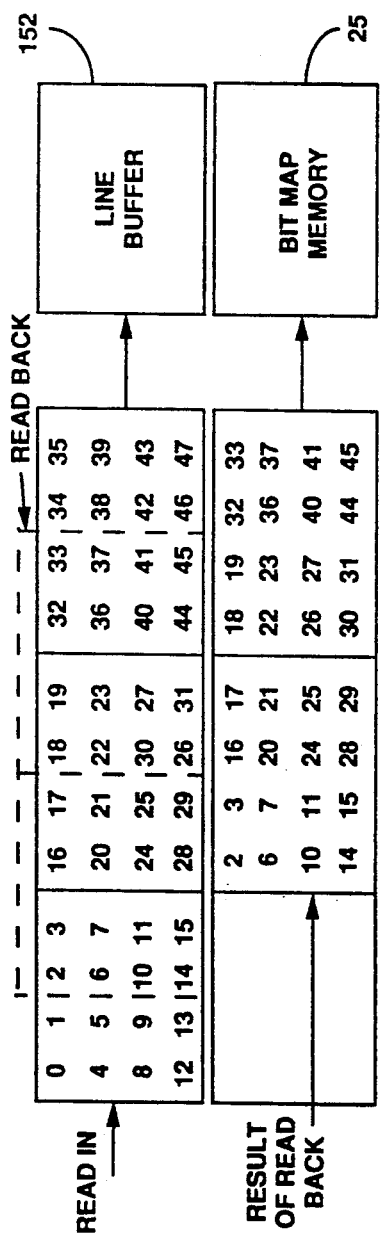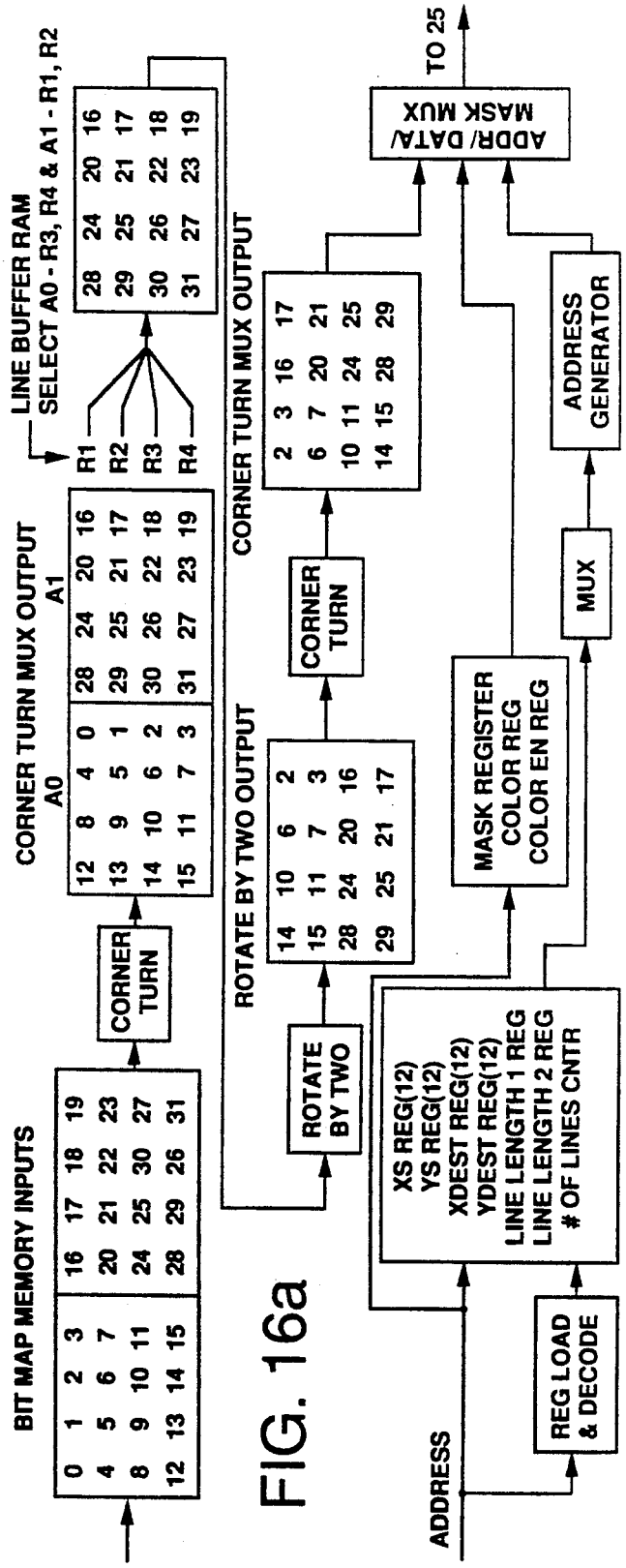
FIG. 16b
FIG. 16a

ACOUSTIC DISPLAY GENERATOR

BACKGROUND OF THE INVENTION

The present invention generally relates to video display generators and more particularly to a display generator which may be employed as a graphics processor in a sonar display system, or the like, that constructs, updates and manipulates sonar images in a bit mapped memory which are displayed on a raster-type display monitor.

Acoustic display systems for use with sonar systems convert sonar data received from a sensor array into a form which is displayed on a cathode ray tube, for example. Many applications for such display systems require fast image display times and image refresh or update rates. Conventional systems which provide for rapid image display include "stroker" monitors which draw images directly on a display screen. Images which can be composed by a series of simple geometric forms are well-suited for such stroker display systems. However, the disadvantages of systems employing stroker monitors include lack of flexibility and high cost. The stroker monitor systems are also not effective when displaying complex video and graphic images. Thus, if the system requires the display of both graphic and sonar data, a second graphics display system is often needed. Furthermore, stroker monitors are baud limited, in that only so many vectors can be drawn during each refresh cycle. Accordingly, this limits the speed of conventional stroker monitors.

Raster scan displays are an inexpensive alternative to stroker displays. Raster scan displays permit an image to be built line by line, and picture element by picture element within each line. Thus, raster scan displays are capable of displaying a wide variety of image types. Furthermore, with appropriate programming, multiple images can be displayed on a single raster monitor by using viewporting, or windowing, techniques. In viewporting, different areas of a single screen are dedicated to different images. Therefore, different image types can be displayed together, or a detail of a scene may be presented with its context displayed on a smaller scale.

However, one disadvantage of conventional systems employing raster monitors is the amount of information which must be generated and formatted to characterize and build the raster image. For example, a 1K by 1K raster monitor has a million pixels. In the case of a red-green-blue (RGB) monitor of such dimensions, color and intensity information must be determined for each of these million pixels at a very fast rate to construct or update the display during each video display cycle.

In most systems using raster-type monitors, the video or acoustic information is serially written into and stored in a bit map memory, so-called because each address in the memory is mapped to a predetermined pixel on the display. Each display cycle generally involves a complete readout of the bit map memory. While the bit map memory readout can be performed rapidly, updating the bit map memory to keep pace with rapidly changing inputs from the acoustic sensor array is a problem in conventional systems due to the huge amount of information which must be generated during each display cycle. Thus, prior processors have had difficulty in updating the bit mapped memory at a rate sufficient to permit rapid readout thereof.

SUMMARY OF THE INVENTION

The present invention overcomes the deficiencies in previous acoustic image display systems, and in particular their inability to construct bit mapped memory images fast enough to keep pace with the display data rate. The present invention provides for a display generator that comprises a parallel, pipelined, multipixel acoustic graphics processor. The acoustic graphics processor comprises an acoustic controller, a pixel formatter and an optional pixel mover, all of which are parallel, multipixel pipelined processors which, once they are configured, operate independently to construct and update the images in the bit mapped memory. In particular, the pixel formatter and pixel mover operate on multipixel groups of signals, generally comprising raster lines and matrices of pixels, respectively. The pixel formatter, acoustic controller and pixel mover are each microprogrammable, thereby enabling them to be optimized for differing application environments.

The present invention is generally employed in conjunction with a system that processes acoustic sensor signals, for example, although other types of data signals may be processed thereby. For example, real time simulators or animation systems may employ the principles of the present invention. The present invention rapidly constructs and updates acoustic images in the bit mapped memory prior to their transfer to a display, and at a rate fast enough to keep pace with the data rate of the incoming data. The display generator formats acoustic signals that are stored in a predetermined sensor formats in a bulk memory, for example, into a plurality of predetermined display formats compatible with the bit mapped memory.

The acoustic controller is a pixel build algorithm processor that performs initializing and monitoring functions in real time. It includes hardware that generates pixel addresses required to construct the images in the bit mapped memory. The acoustic controller is coupled by way of a direct memory access controller to the bulk memory. The direct memory access controller is employed to couple data from the bulk memory to the pixel formatter. The bulk memory stores acoustic sensor signals, including data and display format information, prior to their use by the present invention. The acoustic controller is adapted to manipulate line buffer addresses utilized in the pixel formatter and regulate the data flow through the direct memory access controller and pixel formatter.

A local memory is also coupled to an acoustic processor that operates as a command interpreter used to configure the components of the present invention. The acoustic processor transfers translated command and control signals and parameters to the local memory for storage therein. The local memory provides a command queue which allows many commands to be buffered in a circular buffer. The command and control signals and parameters indicate the manner in which the acoustic signals stored in the bulk memory are to be formatted and displayed.

The pixel formatter processes acoustic signals from the bulk memory and formats the signals into selected ones of a plurality of display formats. A plurality of raster lines and multipixel sets of data signals are processed within the pixel formatter. The pixel formatter then transfers the formatted signals to the bit mapped memory by way of a memory interface. The pixel formatter is an independent pipelined processor having its own controller section and control algorithm processor that provides for processing of the data signals in parallel with and independent from the operations of the pixel mover and acoustic controller. Accordingly, the present invention provides for parallel, multipixel pipelining of data from the bulk memory to the bit mapped memory.

The optional pixel mover is coupled to the bit mapped memory and comprises circuitry which updates selected areas of the image stored in the memory without rebuilding the image from the bulk memory. The pixel mover operates on multiple pixels at a time, namely a matrix array or multiple blocks of pixels comprising sixteen pixels each, for example. The multipixel manipulation capabilities of the pixel mover, including waterfalling of rasters and reorientation of raster pings, and moving and rotating groups of pixels, for example, provides for increased processing speed. However, if high speed processing is not an important aspect of a particular application, the pixel mover need not be employed.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIG. 16a shows the concept of moving the data within memory, and FIG. 16b shows rotation and masking of pixel data, performed in the pixel mover of FIG. 13.

DETAILED DESCRIPTION

Figure 1:
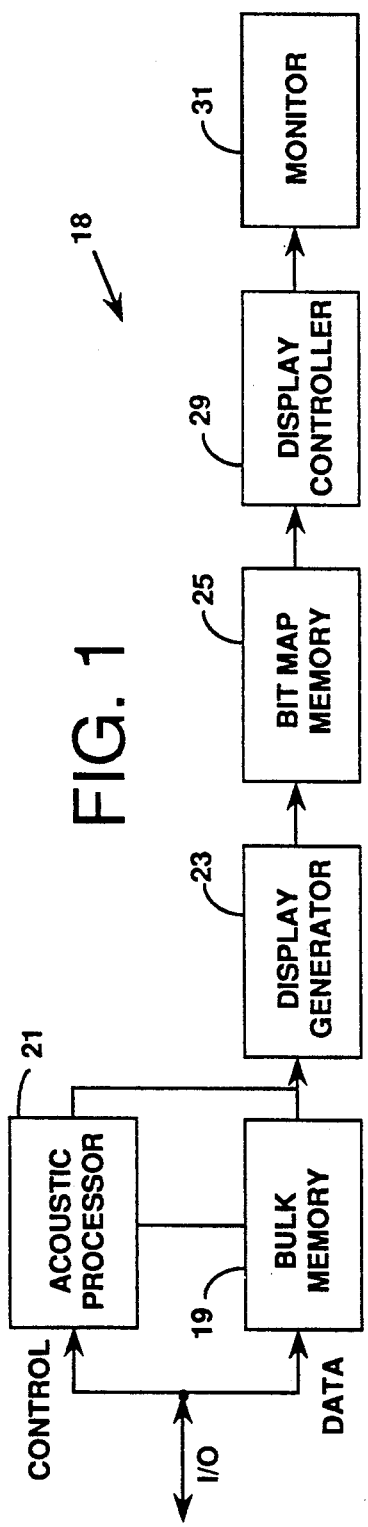
FIG. 1 is a block diagram of a portion of an acoustic display system which incorporates a display generator in accordance with the principles of the present invention.

Referring to FIG. 1, and for the purpose of example, a portion of an acoustic sensor display system 18 utilized in a sonar display system is illustrated. The acoustic display system 18 includes a bulk memory 19 and an acoustic processor 21 that are coupled to an external computer (not shown) in a conventional manner. An acoustic display generator 23 in accordance with the present invention is coupled to the acoustic processor 21, the bulk memory 19 and to a bit map memory 25. The bit mapped memory 25 is in turn coupled by way of a conventional raster-type display controller 29 to a raster-type display monitor 31.

The external computer supplies data signals and control parameters that are indicative of the manner in which the data signals are to be formatted for presentation on the monitor 31. These control and data signals are loaded and stored in the bulk memory 19. This information comprises display lists and data blocks which are utilized by the display generator 23 in constructing and updating the images stored in the bit mapped memory 25.

The acoustic processor 21 is a generic microprocessor based computer which may employ an Intel model 80386 microprocessor, for example. The acoustic processor 21 is configured to read the command files from the bulk memory 19 and translate the files into messages usable by the display generator 23. The display generator 23 utilizes the transferred commands to configure the various functions for the required task, such as to construct and update the images in the memory 25, as will be more fully described below.

The display controller 29 is a conventional raster-type display controller, and it processes images stored in the bit map memory 25 and converts the data by way of a color palette look-up table, for example, into analog color and intensity. The display controller 29 also generates monitor and bit map memory timing signals such as vertical and horizontal synchronization signals in a conventional manner.

Figure 2:
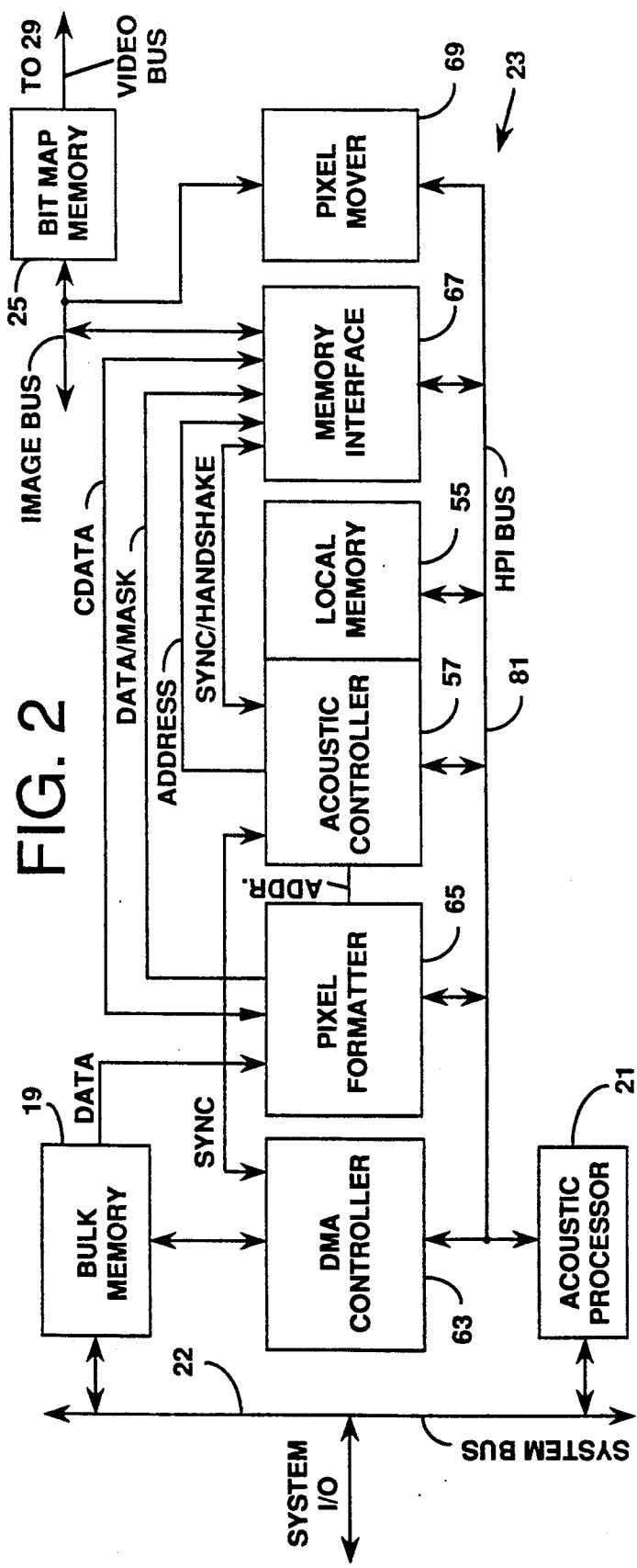
FIG. 2 is a block diagram of a display generator in accordance with the principles of the present invention.

The display generator 23 in accordance with the present invention is detailed in FIG. 2. The display generator 23 comprises an acoustic controller 57 having a local memory 55, a direct memory access (DMA) controller 63, a pixel formatter 65, and an optional pixel mover 69. A memory interface unit 67 is provided to allow the display generator 23 to interface with the bit mapped memory 25. The acoustic controller 57 is coupled to the local memory 55 which is employed to store translated commands transferred from the bulk memory 19 by the acoustic processor 21. The acoustic controller 57 is coupled to the pixel formatter 65, and to the bulk memory 19 by way of the direct memory access controller 63. The direct memory access controller 63 is coupled to the bulk memory 19 in a conventional manner to permit readout of the pixel data and control signals stored therein.

The acoustic controller 57 is coupled to the memory interface unit 67 which is employed to couple pixel addresses to the bit mapped memory 25. The pixel formatter 65 is also coupled to the memory interface unit 67, which is employed to couple pixel values to the bit mapped memory 25. The pixel mover 69 is coupled to the bit mapped memory 25 and operates on the pixels stored therein independently of the pixel formatter 65.

The direct memory access controller 63, pixel formatter 65, acoustic controller 57, memory interface unit 67 and pixel mover 69 are interconnected by way of a host processor interface (HPI) bus 81, which permits transfer of high level commands from the acoustic controller 57 or acoustic processor 21 directly to these elements of the display generator 23 when required.

FIG. 2 depicts two operational embodiments of the present invention. These include an embodiment comprising the acoustic controller 57, local memory 55, pixel formatter 65, direct memory access controller 63 and memory interface unit 67. A second embodiment of the present invention comprises the aforementioned components and also includes the pixel mover 69. The capabilities of these two embodiments will be described in more detail below.

In general, the operation of the display generator 23 is as follows. The display generator 23 operates on data signals stored in the bulk memory 19, and constructs acoustic images in the bit map memory 25 and rapidly updates and manipulates these images. The display generator 23 is initially given instructions by the acoustic processor 21, which translates standard acoustic commands and parameters stored in the bulk memory 19 and deposits them into the local memory 55. The local memory 55 operates as a command queue for the acoustic controller 57. The command queue is read by the acoustic controller 57 and is translated into hardware command messages used to configure the display generator 23.

The acoustic controller 57 configures, synchronizes and supplies addresses for the pixel formatter 65 which is employed to build display formats. It also synchronizes the other elements of the display generator 23. The acoustic controller 57 interprets control messages stored in the local memory 55, and generates data coordinates for the data stored in the bulk memory 19, and downloads the data in segments to the formatter 65 using the direct memory access controller 63. The pixel formatter 65 also generates data and address coordinates for horizontal and vertical rasters. The direct memory access controller 63 provides direct memory access to the bulk memory 19 in a conventional manner.

The pixel formatter 65 processes data words transferred from the bulk memory 19 in blocks comprising a full raster of lines at a time and forwards the processed blocks to the bit map memory 25 by way of the memory interface 67. The acoustic display generator 23 achieves high speed image construction and updates as a result of multipixel transfers. In addition, and as will be detailed below, the pixel formatter 65 processes the data signals using groups of pixels in a pipeline process. These groups of pixels are expanded, compressed and rotated in various stages of the pipeline by the pixel formatter 65.

Figure 3:
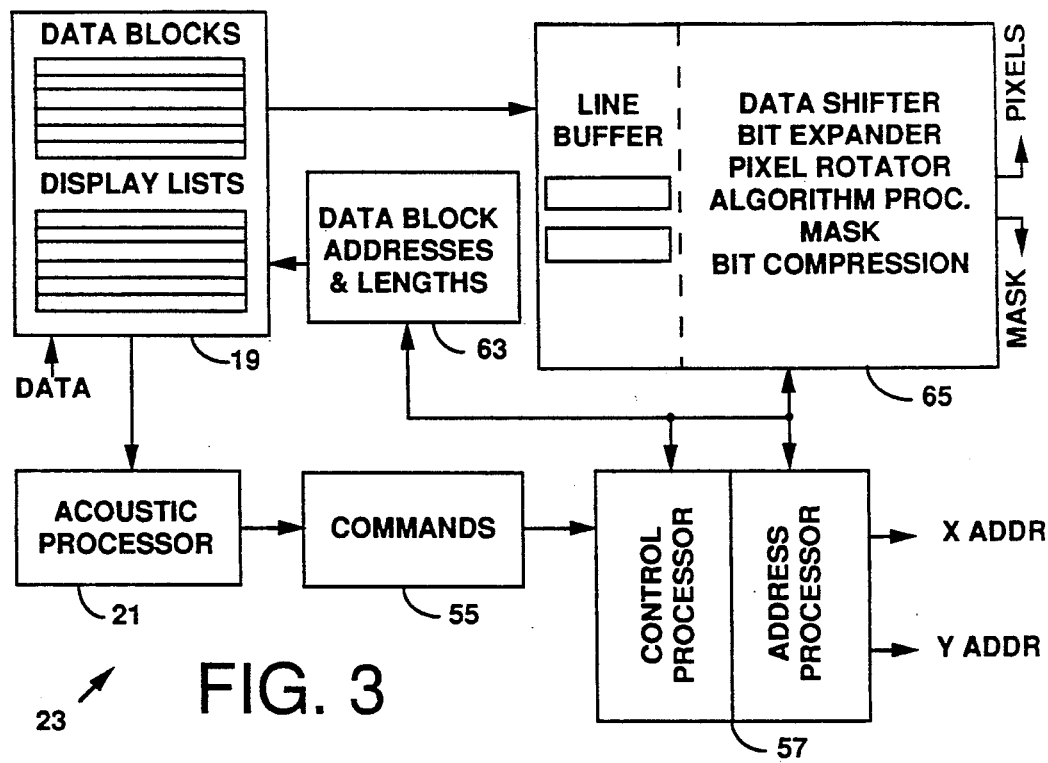
FIG. 3 is a diagram showing process flow in the display generator of FIG. 1.

With reference to FIG. 3, it shows a data flow diagram illustrating the general operation of the acoustic display generator 23. Data blocks containing data words of compressed sonar data, for example, and display lists containing information concerning the display formats which are to be displayed on the monitor 31 are initially loaded into the bulk memory 19. The display lists are transferred to the acoustic processor 21, which acts as a command interpreter for the acoustic controller 57 which sets up the various components of the display generator 23.

Instructions are loaded into the local memory 55, which functions as a two port command queue that is read by the acoustic controller 57. The acoustic processor 21, in accordance with the instructions contained in the command queue, configures the direct memory access controller 63 to generate address locations in the bulk memory 19 to read data to the pixel formatter 65. These address locations are the locations wherein data that is to be displayed on the monitor 31 is located, and this data is read out of the bulk memory 19 into the formatter 65. The formatter 65 includes a two word line buffer which accepts and stores one full raster line of data while the other is processed within the pixel formatter 65.

The formatter 65 operates to format the compressed data words in accordance with format instructions loaded into the local memory 55. The formatter 65 operates on one (4 or 8 bit), two (8 bit) or four (4 bit) pixel sets of data at a time, for example. The formatter 65 is a pixel processor which operates independent of the pixel mover 69 and controller 57, once it is set up by the controller 57. The formatter 65 provides for a plurality of formatting processes including: expansion of each word of data to a predetermined number of bits per pixel (4 or 8), rotation of the pixels in the four by one pixel array of data, masking of data within the pixel array, compression of a programmed group of pixels to one pixel, and algorithm processing to accomplish boundary masking. These processes will be discussed in more detail below.

Figure 4:
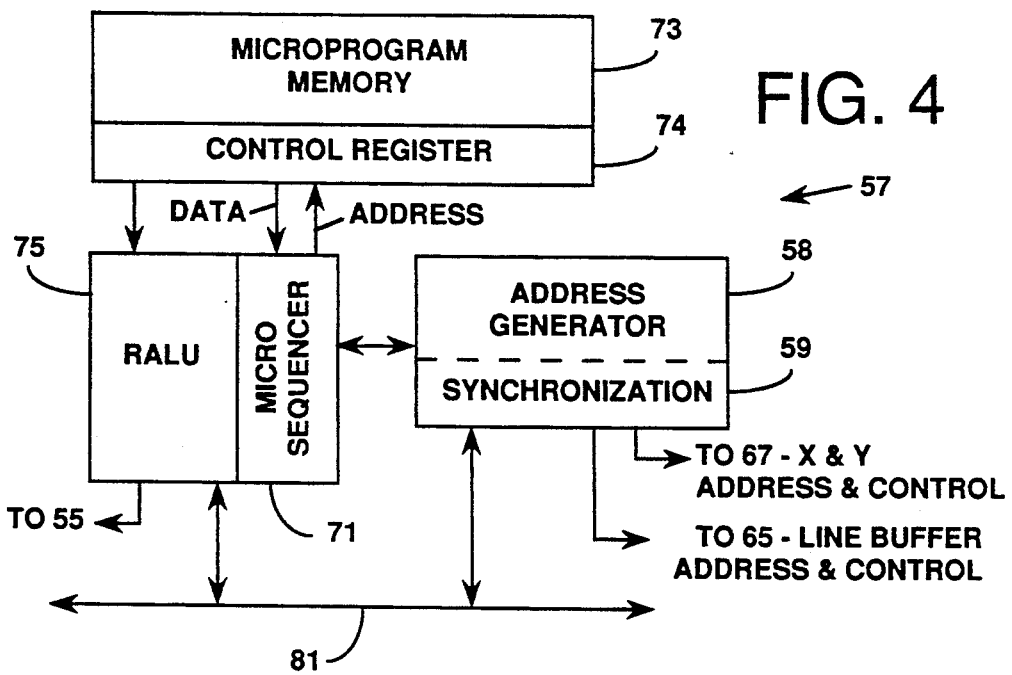
FIG. 4 shows the controller of the display generator of FIG. 2.

The components of the acoustic controller 57 will now be described in detail. With reference to FIG. 4, the acoustic controller 57 includes pixel address generators 58 and a synchronization logic module 59, a microsequencer 71, a microsequencer memory 73 having an output control register 74, and a register and a conventional bit slice arithmetic logic unit (RALU) 75. The pixel address generators 58 and synchronization logic module 59 are coupled to the pixel formatter 65, and operates synchronously to it. It also interfaces to the interface unit 67 and the system bus 81 by way of an HPI port 89. The register and arithmetic logic unit 75 is coupled to the system bus 81 and to the local memory 55. These components are generally well understood in the art and their interconnection details will not be described.

The controller 57 interprets messages that are received from the acoustic processor 21 and stored in the local memory 55. The controller 57 translates these stored messages into hardware command messages. The controller 57 generates raster X and Y addresses of the formatted pixel data when building new signal formats. The acoustic controller 57 synchronizes and monitors the operation of the formatter 65, address generator 58, direct memory access controller 63 and the memory interface unit 67 by employing conventional discrete synchronization signals and "handshaking" between these components. When building a raster image, the acoustic controller 57 reads data from raster line description tables stored in the local memory 55, which data is used to update address accumulators with offset values indicating new bit mapped memory locations for the information.

Figure 5:
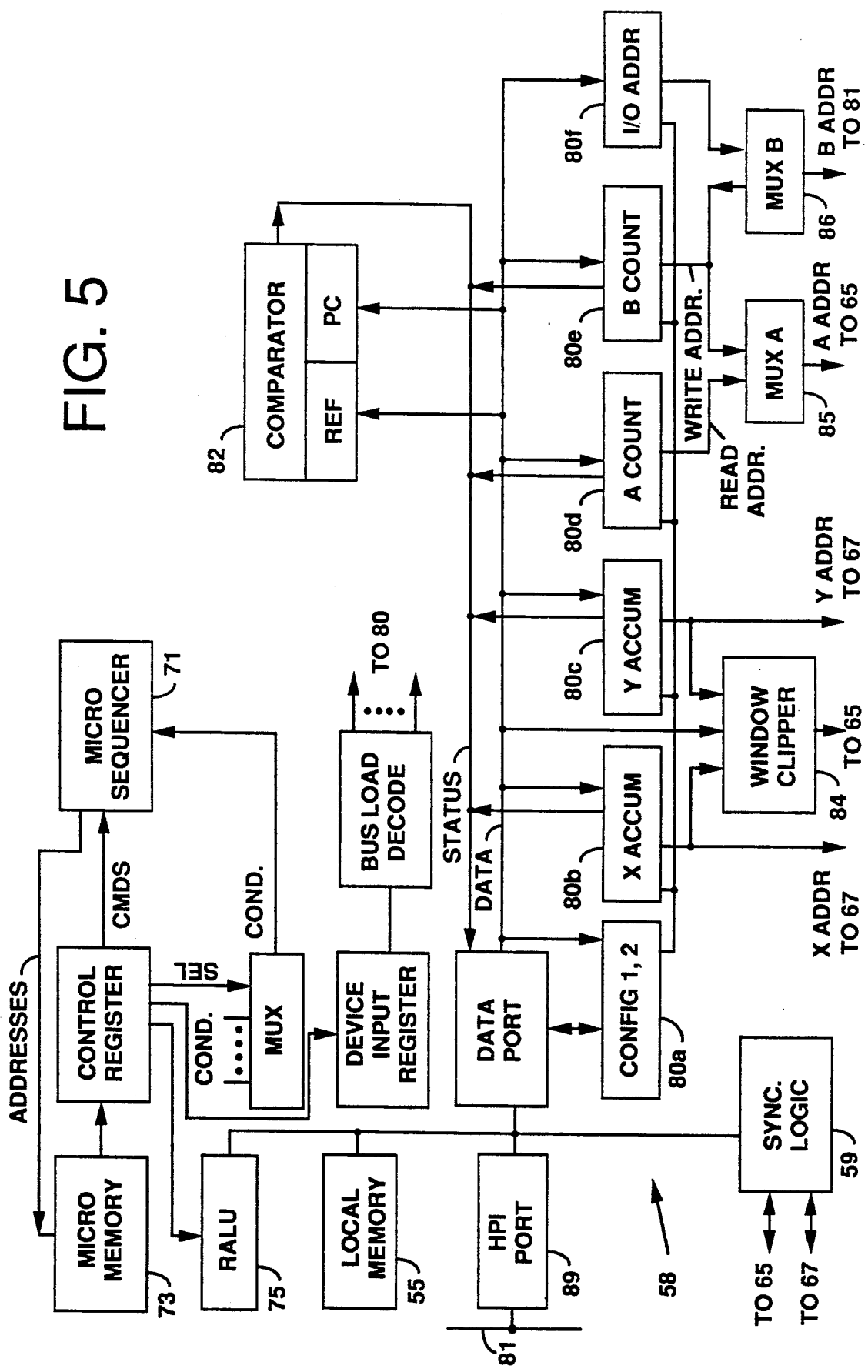
FIG. 5 shows a detailed illustration of the address generator of FIG. 4.

With reference to FIG. 5, a more detailed illustration of the controller 57 is shown, specifically detailing the address generator 58 thereof. In addition to the components described above with reference to FIG. 4, the address generator 58 includes a plurality of registers 80a-f identified as CONFIG 1, 2 (80a), X ACCUM (80b), Y ACCUM (80c), A COUNT (80d), B COUNT (80e) and I/O ADDR (80f). A comparator 82 which provides REF and PC signals is provided to monitor the completion of a pixel block of programmed length in the REF register to the current pixel count in PC. A window clipper 84 and two output multiplexers 85, 86 are also provided which are coupled to the A COUNT, B COUNT and I/O ADDR registers 80d, 80e, 80f. The window clipper is employed to prevent writing of data to the bit mapped memory 25 outside a predetermined window area programmed during configuration. The B address port, multiplexer 86, is the address and handshake control port to the bus 81 employed to initiate the devices thereon.

The X accumulator and Y accumulator are programmed to perform a repetitive operation on a group of pixels (vector processing) by configuration register 1 (80a). The configuration register 1 fields are defined in Table 1a. The X and Y accumulator modes are provided in Table 1b. The X and Y accumulators provide pixel addresses to the memory interface unit 67 which corresponds to the pixel data produced by the pixel formatter 65. The accumulator update enable is selected by the X accumulator and Y accumulator fields given in Tables 1c and 1d. The X mode ad Y mode fields define the mode of operation of the X and Y accumulators. XAC and YAC selects the conditions required for updating the X and Y accumulators.

TABLE 1a

| Bits | Configuration register fields | |
|---|---|---|
| | Register 1 | Register 2 |
| 0 | YMODE | ACNTR |
| 1 | YMODE | ACNTR |
| 2 | YMODE | UNUSED |
| 3 | YAC | SLA |
| 4 | YAC | ESA |
| 5 | YAC | BCNTR |
| 6 | XMODE | BCNTR |
| 7 | XMODE | UNUSED |
| 8 | XMODE | SLB |
| 9 | XAC | UNUSED |
| 10 | XAC | PCNTR |
| 11 | XAC | PCNTR |
| 12 | UNUSED | UNUSED |
| 13 | UNUSED | UNUSED |
| 14 | UNUSED | UNUSED |
| 15 | UNUSED | UNUSED |

The above register 1 fields are defined in the following Tables 1b, 1c and 1d.

TABLE 1b

X or Y address accumulator 80b, 80c (XAC, YAC) modes

| | |
|---|---|
| 00X | 0 to accumulator |
| 010 | delta register transfer to accumulator |
| 011 | accumulator to accumulator (hold old value) |
| 10X | base register transfer to accumulator |
| 110 | base register plus delta register to accumulator |
| 111 | base register plus delta accumulator to accumulator |

TABLE 1c

X address accumulator 80b (XAC) condition select

| | |
|---|---|
| 0 | disable update |
| 1 | unconditional update |
| 2 | A counter carry |
| 3 | XY update = (LREQ/*XYUPDATE/*MIUWAIT*RunHalt) |
| 4 | Y accumulator carry |
| 5 | B counter carry |

TABLE 1d

Y address accumulator 80c (YAC) condition select

| | |
|---|---|
| 0 | disable update |
| 1 | unconditional update |
| 2 | A counter carry |
| 3 | XY update = (LREQ/*XYUPDATE/*MIUWAIT*RunHalt) |
| 4 | X accumulator carry |
| 5 | B counter carry |

The A and B counters are used to address the read and write addresses of the line buffer in the pixel formatter 65, and are configured to perform a repetitive operation by the configuration register 2 (80a). The operations of the configuration registers 80a are enabled to run by the comparator 82 which is updated by the number of pixel transfers monitored by the pixel count (PC) register and compared to the reference (REF) register. In particular, the A and B counters generate read and write addresses to the line buffers in the formatter 65, enabling a time multiplexed operation of reads and writes. The PC counter is used to keep track of the current output pixel count being drawn in the current line. With the REF register as a programmed comparison value, the two registers can be compared by the comparator logic and when PC is greater or equal to REF, the hardware halts further formatter operation until set up by the controller. The three counters (A, B, PC) are controlled by the configuration register 2 (80a), using the fields in Table 1a. The A, B and PC counter fields of Table 1a are presented in Tables 1e through 1g.

TABLE 1e

A counter 80d (ACNTR) condition select

| | |
|---|---|
| 0 | no count |
| 1 | count |
| 2 | INA (external input) |
| 3 | AUPDT = (TNEXT*RunHalt) |

TABLE 1f

B counter 80c (BCNTR) condition select

| | |
|---|---|
| 0 | no count |
| 1 | count |
| 2 | INB (external input) |
| 3 | BUPDT = (TNEXT = *GO*BRDY); TNEXT is a status/synch bit |

TABLE 1g

PC counter 82 (PCNTR) condition select

| | |
|---|---|
| 0 | no count |
| 1 | unconditional count |
| 2 | INC (external input) |
| 3 | XYUPDT = (LDREG/*MWAIT*RH) |

Enabling bits are presented in Table 1h. ESA enables the selection of the data source of the A ADDR port (mux 85) by the SLA bit when ESA=1. When ESA=0 the SLA bit has no effect and the source selection is performed by the input line NEXT/from the formatter 65. SLA selects the source of A ADDR port between A count when zero or B count when enabled by ESA=1. SLB selects the source of B ADDR port (mux 86) between B count when zero or I/O ADDR when 1. ACNTR, BCNTR and PCNTR are condition select fields for the A counter, B counter and PC counter, respectively, which select the conditions which will enable these counters to increment.

TABLE 1h

| Enabling bits | | | |
|---|---|---|---|
| ESA | SLA | TNEXT | AADR (MUX A) |
| 1 | 0 | X | A counter |
| 1 | 1 | X | B counter |
| 0 | X | 0 | A counter (read) |
| 0 | X | 1 | B counter (write) |
| | SLB | BADR (MUX B) | |
| | 0 | B counter | |
| | 1 | IOADR register | |

The I/O address register (I/O ADDR) 80f fields are presented in Table 1i.

TABLE 1i

| I/O address register fields | |
|---|---|
| Bits | Field |
| 0 | A0 |
| 1 | A1 |
| 2 | A2 |
| 3 | A3 |
| 4 | A4 |
| 5 | X |
| 6 | WR |
| 7 | RD |
| 8 | X |
| 9 | IR |
| 10 | DM |
| 11 | BS |

BS generates an active low signal BUSREQ/to the bus 81 when BS=1. DM generates an active low signal DMAREQ/signal when DM=1. OR generates an active low signal INTREQ/when IR=1 to indicate that there is an interrupt request from the acoustic controller. RD (read) generates an active low RD/signal when set to 1. It is disabled when the port has been acknowledged by the external device. WR (write) generates an active low WR/signal when set to 1. It is disabled when the HPI port 89 has been acknowledged by the external device. A represents the five bit active high address bits of the HPI port which are used by the acoustic controller.

Rather than employ command words, the synchronization logic 59 contains logic which is used to configure external functions. The bits controlled by the synchronization logic 59 are defined in Table 1j.

TABLE 1j

| Synchronization register control bits | | | |
|---|---|---|---|
| Bits | Field | Description | To device |
| BR | 0 | Enable bit to BREQ/circuit | DMA control |
| NL | 1 | Direct to NORM/ | formatter |
| VH | 2 | Vertical or horizontal pixel builds | formatter |
| RH | 3 | Direct to RUN/Halt | formatter |
| CR | 4 | Direct to external function generator | external generator |
| PR | 5 | Direct to PENA/(pixel mover run/halt) | pixel mover |
| RW | 6 | spare | formatter |
| AS | 7 | X. Y address select (ext. function generator) | external generator |
| SC | 8 | Direct to STRNCUR/(stern cursor) | formatter |
| IC | 9 | IConfigure MIU (0 = 4 bit/pixel, 1 = 4 bit/pixel | memory interface |
| LP | 10 | Direct to LASTPX/ | formatter |
| BS | 11 | Bank select (0 = lower bank, 1 = upper bank | |

The above-described registers configure and control the pixel address, line buffer address and synchronization of the display generator 23 during pixel processing.

This operation will then run until halted by the comparator 82 which indicates to the controller 57 that a small modification to the process, such as an address jump or discontinuity in the process requires an adjustment.

The controller processor, comprising components 71-74, updates the display generator 23. Once this processor controller is enabled, it runs in a burst mode. The break points are programmed in the comparator 82. The controller processor only updates these parameters allowing the display generator 23 to process the next burst of data.

Figure 6:
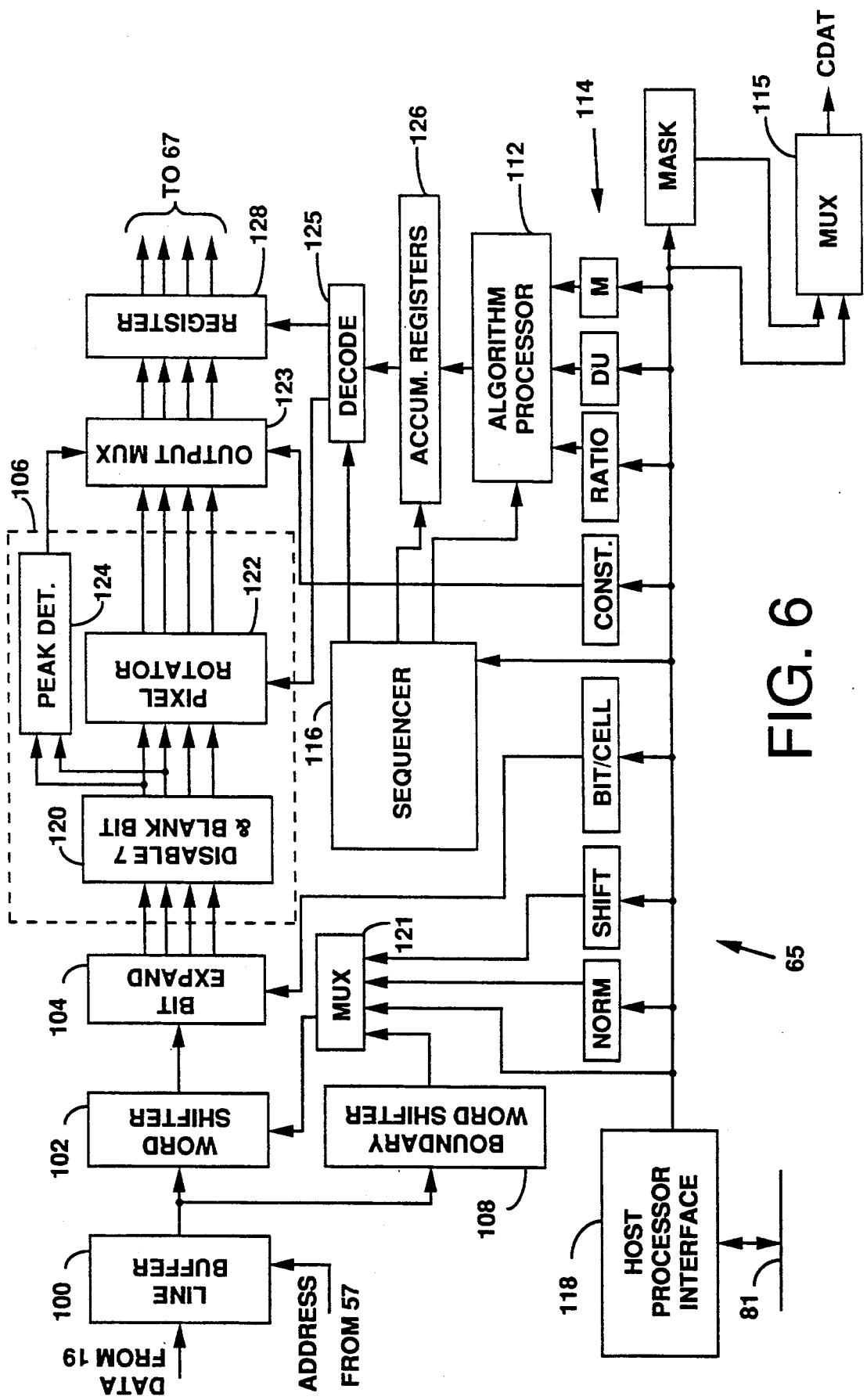
FIG. 6 shows the pixel formatter of the display generator of FIG. 2.

With reference to FIG. 6, which details the pixel formatter 65, it includes as major components, a line buffer 100, word shifter logic 102, bit expander logic 104, pixel shifter logic 106, boundary word logic 108, decode logic 110, an algorithm processor 112, a command register 114, a control sequencer 116 and a host processor interface 118. Data from the bulk memory 19 is coupled into the pixel formatter 65 by way of the line buffer 100.

The line buffer 100 is coupled to the word shifter 102 and boundary word logic 108. The manipulative components of the formatter include the word shifter 102, bit expander logic 104 and pixel shifter logic 106, which are sequentially interconnected along a common data path. The control sequencer 116 interfaces to the host processor interface 118 by way of the command register 114, the algorithm processor 112, and decoder logic 110 by way of the algorithm processor 112. These elements are adapted to process algorithms in order to construct and update bit mapped images. The control sequencer 116 is employed to control the coupling of the synchronization logic, address and control signals to both the memory interface unit 67 and the acoustic controller 57.

The pixel shifter logic 106 includes disable 7 and blank bit logic 120, pixel rotator logic 122, peak detector 124, output multiplexer 126 and output register 128. The command register 114 includes the following registers: NORM, SHFT, BIT/CELL, CONS, RAT, DU, M, RD BACK, MIU and MASK, as shown. The command register 114 are loaded with configuration parameters, which remain unchanged during the processing sequence. Dynamically changing parameters are computed by the algorithm processor 112. These registers and the operation of the formatter 65 will be explained in more detail hereinbelow.

The word shifter 102 is a conventional 32 bit shifter allowing 1 to 16 bit shifts per clock cycle. Is is employed to read 4 pixels at a time out of the register, with 4 pixels comprising 1 to 4 bits per pixel. The bit expander 104 expands an input "cell" of one to 8 bits each to the standard 4 or 8 bits per pixel. It does so by left justifying 4 adjacent cells then 0 or 1 fill the empty bits. If the cell is 1 bit, then 3 bits are fill bits. In this way the standard 4 or 8 bits per pixel is provided as an output. The disable 7 and blank bit logic 120 is logic which overrides the pixel equal to 7 forcing it to zero. The pixel rotator 122 is employed to replicate and shift the input pixels during stretching operations. For example, if the incoming pixels comprise pixels P1, P2, P3 and P4, then a three times stretching operation (3DU stretch) generates the following pixel sets: P1, P1, P1, P2; P2, P2, P3, P3; P3, P4, P4, P4. The three sets of output pixels are provided by pixel rotation logic. The boundary word shifter 108 is a shifter and decoder which, in single pixel mode, using a boundary descriptor word contained in a data word header, unpacks sparsely filled input words by indicating the location of pixels in the data word. Therefore those pixels containing useful information are extracted from the sparsely filled input words and employed by the formatter 65. The output multiplexer 123 is a three input multiplexer that selects the source of the output pixels from the pixel rotator 122, peak detector 124 or constant register for output from the formatter 65.

The operation of the pixel formatter 65 is such that it receives data by way of the line buffer 100 from the bulk memory 19 under control of the direct memory access controller 63. The data transfers are accomplished in a conventional manner. The line buffer 100 holds two lines of rasters, which permits one line to be processed while the other line is loaded. The formatter 65 unpacks 32 bit wide data words received from the bulk memory 19, formats them into pixels and transfers them into the bit map memory 25 by way of the memory interface unit 67. To accomplish this, the word shifter logic 102, bit expander logic 104, pixel shifter logic 106 and boundary descriptor word (BDW) shifter logic 108 respond to commands stored in the registers comprising the command register 114. The pixel formatter 65 unpacks individual cell fields and expands them into pixel fields having 4 or 8 bits per pixel, in accordance with size information provided by the controller 57, and as will be more fully described below. The components of FIG. 6 replicate, and hence stretch the image, or compresses the image using the peak detector 124 as will be detailed below.

More specifically, the pixel formatter 65 is a three stage pipeline processor which processes input data received from the bulk memory 19. This data is input through the line buffer 100 which is loaded by the direct memory access controller 63. This data is manipulated by the word shifter logic 102 which aligns the currently used cells in the word so that the next four cells can be expanded to four or eight bits per cell by the bit expander logic 104. If the input data cells are not packed end to end, then a boundary descriptor word is supplied by the boundary word descriptor logic 108 by way of multiplexer 121. A boundary descriptor word is supplied with the input word and the boundary descriptor word shifter is used to decode the required shift following each cell to unpack the pixels.

The bit expander logic 104 provides four expanded cells to the disable 7 circuit 120, which operates as a clamp circuit, that converts all cells which are hex E or hex F to a 0 or 1. If the data is not enabled, it passes through this stage unchanged. The cells then are processed by the pixel rotator logic 122, which performs replication of the cells by selecting the output pixels from among the four input cells. The outputs of the pixel rotator logic 122 are applied to the output multiplexer 126, which selects which pixel is coupled to the memory interface unit 67. A multiplicity of single pixel and multipixel modes are available for selection. The selected pixels are loaded into the output register 128, which comprises four pixel latches. The peak detector 124 may be employed during single pixel transfers, which selects the peak value of a group of inputs, passing the result to the output multiplexer 126. The peak detector 124 may be programmed to reset for any number of cells sampled and to output only the last peak value, thus causing the output to be a compressed peak detected line.

The sequencer 116 uses the algorithm processor 112 to update those parameters which are constantly changing, such as the pixel rotator, boundaries of pixels, end of words so that all words in the register are used, and concatenation of new words to unprocessed portions of old words. The sequencer 116 in the formatter 65 is programmed using a formatter assembly language instruction set. The instruction set is used to program assembler mode bits which generate specific operation codes from generic types. The following mode bits are employed and are programmable. CC=1 indicates that the process is in the concatenation mode. CS indicates that the process is in a start of line concatenation mode which involves masking and offsets of output pixels. When CS and CC are 0, then a normal process mode is enabled. DU specifies to the algorithm that the 1, 2, 3 or greater than 3 pixel expansion algorithms are to be enabled.

The pixel formatter 65 assembly language instruction set is used to program the sequencer 116 which also uses the algorithm processor 112 to sequence the formatter 65 during its operation. The instruction set includes branch instructions that are defined as unconditional if no condition is specified or conditionally true if specified, or conditionally false if specified with a slash in front of the condition. The following conditions may be specified: NQIVAL, NQDVAL, OUTRDY, NLDRDY, LASTPX, RUN, M0, M1, DUGR2, NBZERO, EMPTY, PKDETY, CXP, M2, CM, BEQZ, NORM, BGRZ, BSIGN, NDUEQX, DXGR3, JGRZ, NCARRY and NTERCT, all of which are process status flags from the algorithm processor or controller.

Control flags employed in the instruction set are similar to the mode bits and to the mode flags. They include: CC and CS which define the process modes. CC=0 and CS=0 defines a normal process. CC=1 and CS=0 defines an interword concatenate process. CC=0 and CS=1 defines a start line concatenate process. OUTENA enables output updates. FBBY is a formatter busy flag. OPINHB is disable formatter output to the memory interface unit 67. SHIFTENA enables shifting of the word shifter 102.

Programmable pulse signals generate triggers to various hardware state sequencers and register loads causing a process to initialize a parameter holding register. Valid pulsed flags include REQNXT which requests the next input to the line buffer. LDAREG initializes the control register of the sequencer and executes the process. LOADDU loads the DU register in the algorithm processor. FLUSH generates a pulse to the memory interface unit to flush out its pipeline. CLDVAL clears the status flag of the input data register. PKCLR clears the peak detector to zero and loads SUCNTR. OFSRQ requests an "offset request word" from the local memory 55. RUNCC loads the control register of the sequencer and executes that instruction until the stop condition is met. NCLR clears the sequencer to zero terminating any sequence.

The adder control fields are indicated in Tables 2a-c below.

TABLE 2a

| Adder Control Fields: CC/ AND CS/ Modes | | |
|---|---|---|
| DU = 1 | DU = 2 | DU > 2 |
| NOOP | NOOP | NOOP |
| NX = NX − 4, S | NX = NX − 2, S | NX = NX − 4, X2 = DX |
| NX = M | NX = M | NX = M |
| NX = NX − 1 | NX = NX − 1 | NX = NX − 1 |
| DX = DU | DX = DU | DX = DU |

TABLE 2a-continued

| | Adder Control Fields: CC/ AND CS/ Modes | |
|---|---|---|
| DU = 1 | DU = 2 | DU > 2 |
| DX = DX + DU | DX = DX + DU | DX = DX + DU |
| DX = DX + RAT | DX = DX + RAT | DX = DX + RAT |
| NX = DX = 0 | NX = DX = 0 | NX = DX = 0 |
| DX = DX + J | DX = DX + J | DX = DX + J |
| DX = X2 | DX = X2 | DX = X2 |
| DX = DX − 1 | DX = DX − 1 | DX = DX − 1 |
| NX = NX − 1, S | NX = NX − 1, S | NX = NX − 1, S |
| NX = NX | NX = NX | NX = NX |

TABLE 2b

| | Adder Control Fields: CC/ AND CS Modes | | |
|---|---|---|---|
| DU = 1 | DU = 2 | DU = 3 | DU > 3 |
| NOOP | NOOP | NOOP | NOOP |
| NX = NX + J | NX = NX | DX = | DX = |
| | | DX − 4 | DU − 4 |
| NX = NX − 4 | NX = NX − 1, S | DX = | DX = |
| | | DX + J | DX + J |
| | | DX = | DX = |
| | | DX + DU | DX + DU |
| | | NX = | NX = NX |
| | | NX − 1, S | |

TABLE 2c

| | Adder Control Fields: CC/ AND CS/ Modes | | |
|---|---|---|---|
| DU = 1 | DU = 2 | DU = 3 | DU > 3 |
| NOOP | NX = M | NOOP | NOOP |
| NX = | NX = | NX = | NX = NX |
| NX + M, S | NX − 1, S | NX − 1, S | |
| | NOOP | DX = | DX = |
| | | X2, X2 = DX | X2, X2 = DX |
| | | NX = M | NX = M |

Figure 7:
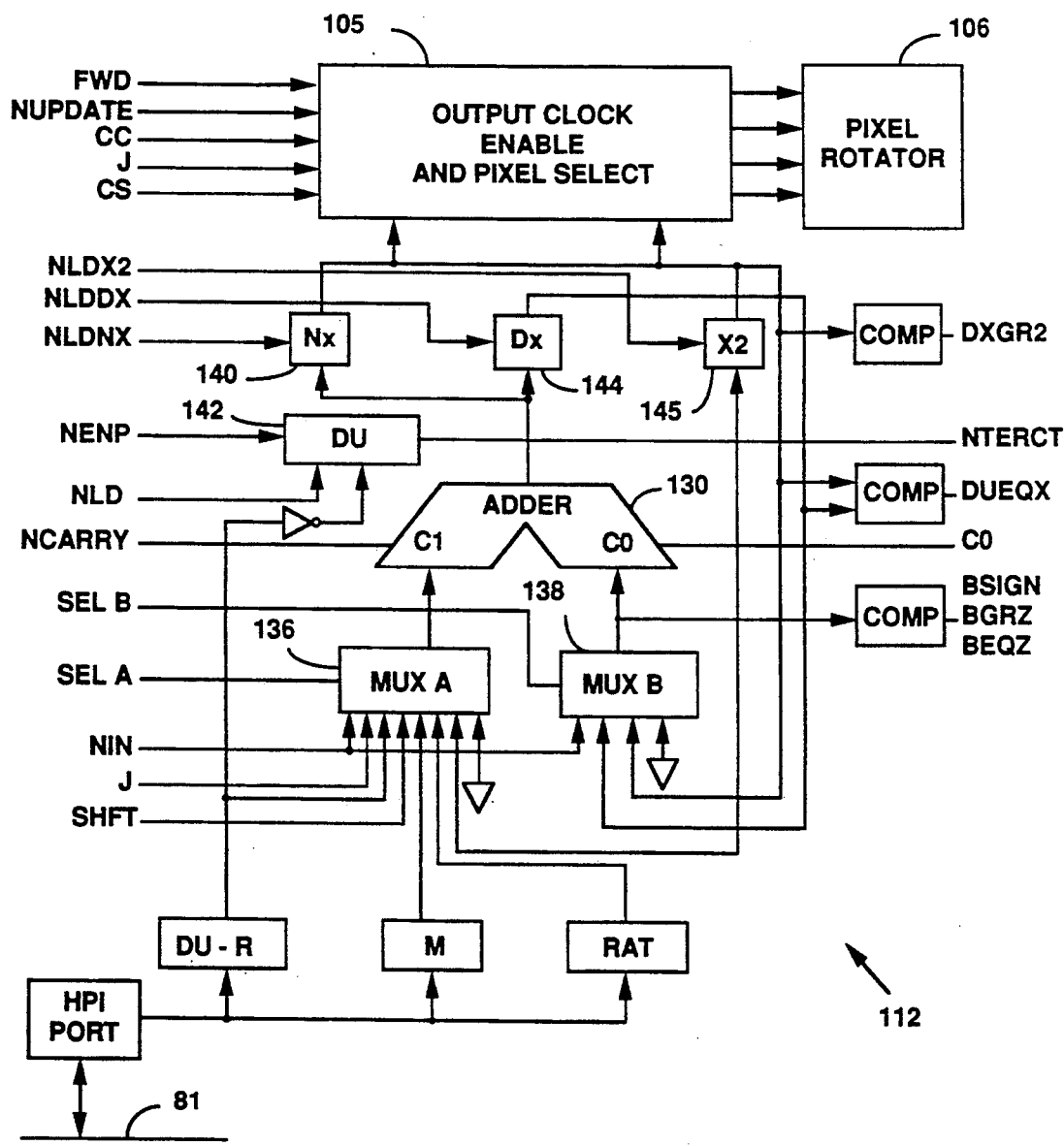
FIG. 7 shows the algorithm processor of the pixel formatter of FIG. 6.

FIG. 7 shows a diagram of the algorithm processor 112 employed in the formatter 65. The algorithm processor 112 controls the dynamically changing control parameters including bit stretching and compression boundaries of the data words. The algorithm processor 112 comprises an adder 130, two accumulators 142, 144 and two input multiplexers 136, 138 coupled to the adder 130. A temporary holding register 145 and a DU counter 142 are provided as shown. The algorithm processor 112 is controlled and monitored by the sequencer 116 in the formatter 65. The sequencer 116 generates clock strobes an control bits and monitors the states of the registers of the algorithm processor 112. The algorithm processor 112 includes the DU counter 142 and Dx accumulator 144 which indicates the remaining stretching pixels starting from the value of DU and decrementing by the output pixel number until it registers zero or minus. The Nx accumulator 140 holds the current remaining cells in the data shift register, so that when it becomes zero, another input is requested from the line buffer. The two accumulators 140, 144 select inputs from static control registers and immediate data from the sequencer 116. Table 3 indicates the inputs that are controlled by the algorithm processor 112.

TABLE 3

| | Inputs Controlled by the Algorithm Processor | |
|---|---|---|
| Code | MUX A input | Function |
| 000 | NIN | Immediate data from microsequencer (−4 to +3) |
| 001 | J1, J0 | LSB of pixel address (selects boundary modes) |
| 010 | DU | stretching factor |

TABLE 3-continued

| | Inputs Controlled by the Algorithm Processor | |
|---|---|---|
| Code | MUX A input | Function |
| 011 | 0 | all zero |
| 100 | M | Pixels/word |
| 101 | SHFT | Shifter value used by data shifter |
| 110 | RAT | fractional part of stretch factor |
| 111 | X2 | holding register of Dx (load with NLDX2) |

The accumulators 140, 144 are identified in FIG. 7 as Nx and Dx. Nx, Dx and zero are fed back to the input of the adder 138, MUX B, controlled by the SEL B lines. Nx normally contains the remaining pixels in the word starting with M and is decremented by a predetermined amount each time a new pixel is shifted by the pixel shifter. Dx is the remaining stretching amount starting at Dx=DU. Each time the formatter outputs four pixels, DU is decremented by four. The value remaining in Dx is used to control the output by way of the pixel rotator and mask logic. The accumulators 144, 146 are loaded from the following control registers: M, DU, RAT, J, NEN, and SHFT MUX.

Figure 8:
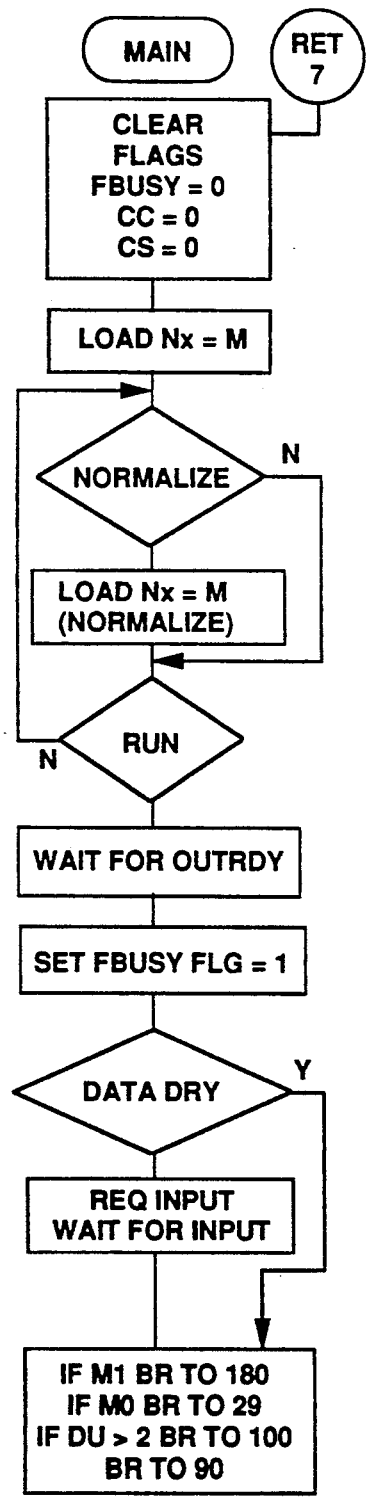
FIG. 8 shows a flow diagram illustrating the primary process loop for the pixel formatter of FIG. 6.

The control sequencer 116 employs several single pixel and multipixel algorithms. Flow charts of these algorithms are presented in FIGS. 8-12. The primary processing loop of the algorithm is shown in FIG. 8, which comprises an initialization of the flags and an idle which waits for an OUTRDY signal which is sent prior to branching to selected process algorithms. A normalizing process is included which performs preshifting of the first word so that the value is normalized and not starting on pixel one of the first word. This operation is enabled by the NORM signal from the controller 57.

Figure 9:
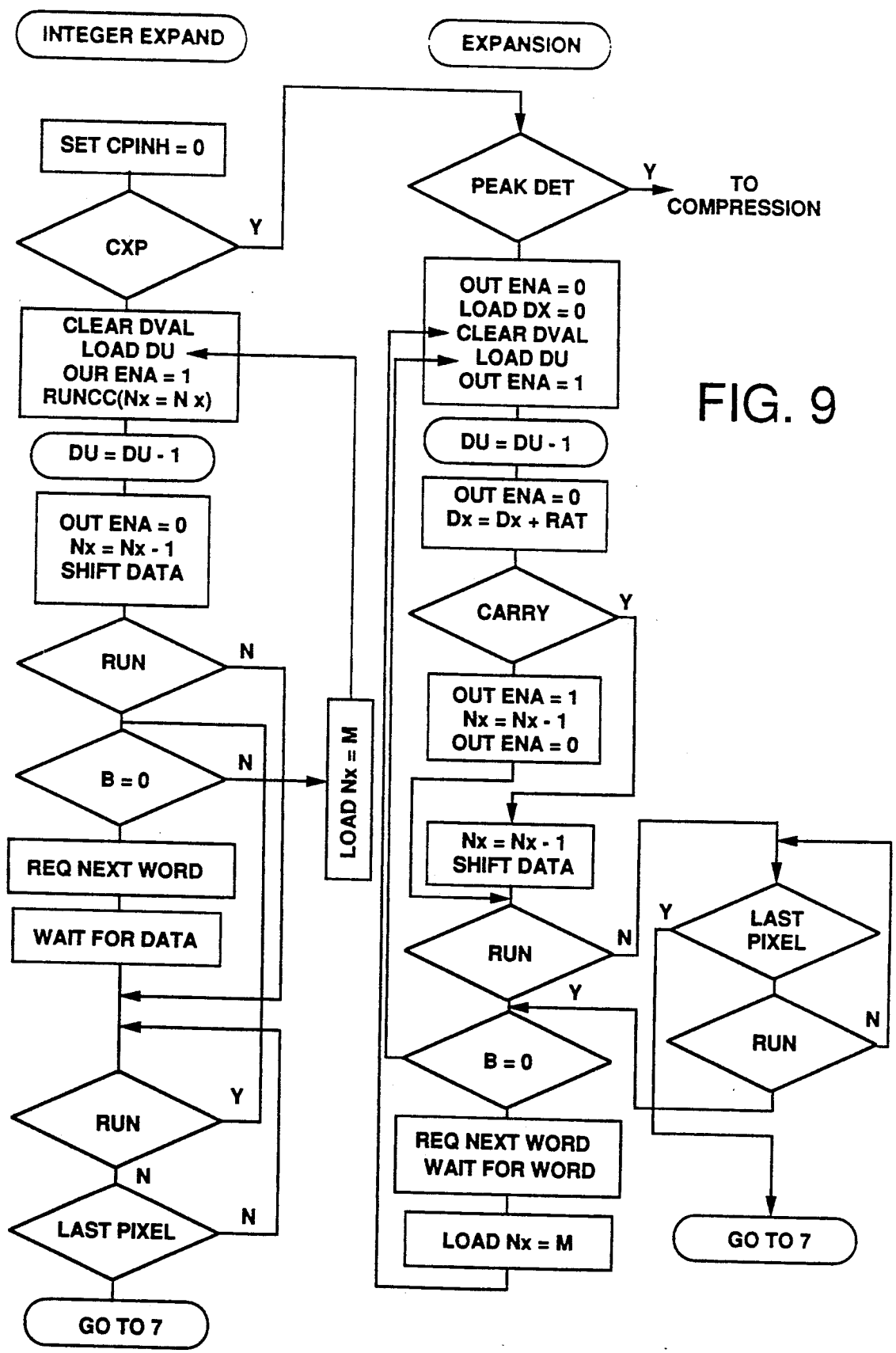
FIG. 9 shows a flow diagram illustrating the process flow for expansion sequences implemented in the pixel formatter of FIG. 6.

For single pixel builds, the algorithm of FIG. 9 is employed. This algorithm employs integer expansion and fraction expansion subalgorithms, and is used to build uncompressed, integer expanded vectors or rasters in single pixel modes. It outputs single pixels at a time to the memory interface unit 67. The second single pixel expansion algorithm expands the input by an integer and a fractional part. This is accomplished by expanding the integer "DU" times and then adding the programmed fractional part, RATIO, to the accumulator 144 (FIG. 7).

Figure 10:
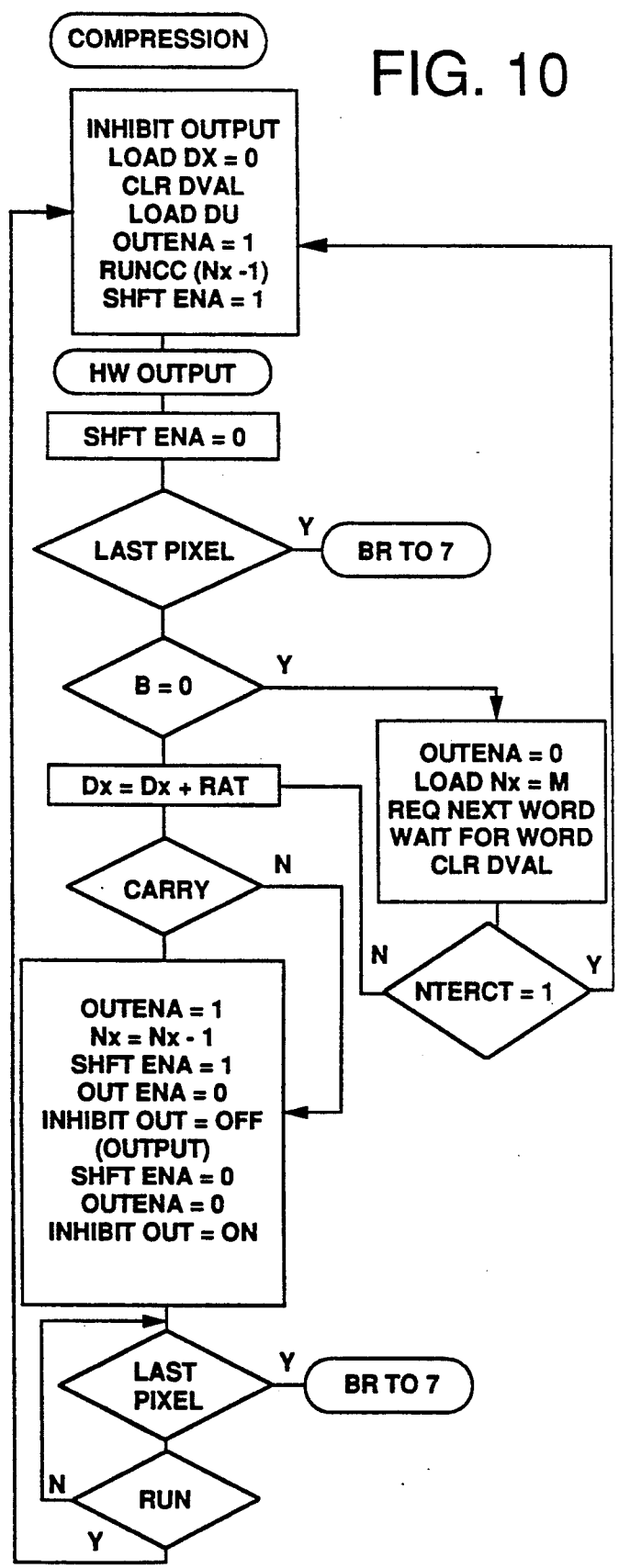
FIG. 10 shows a flow diagram illustrating the process flow for compression sequences implemented in the pixel formatter of FIG. 6.

The compression sequence algorithm is shown in FIG. 10. The peak detector 124 of the formatter 65 is employed to implement the compression algorithm. In the algorithm, the output is disabled by NCPINHB. Consequently, an output from the formatter 65 does not generate any loads to the memory interface unit 67. Once the integer "DU" amount is peak detected, then the accumulator 144 adds the RATIO and if there is a carry then one more input cell is compared to the current peak before the value in the peak detector 124 is output to the memory interface unit 67, after which the peak detector 124 is cleared.

Figure 11:
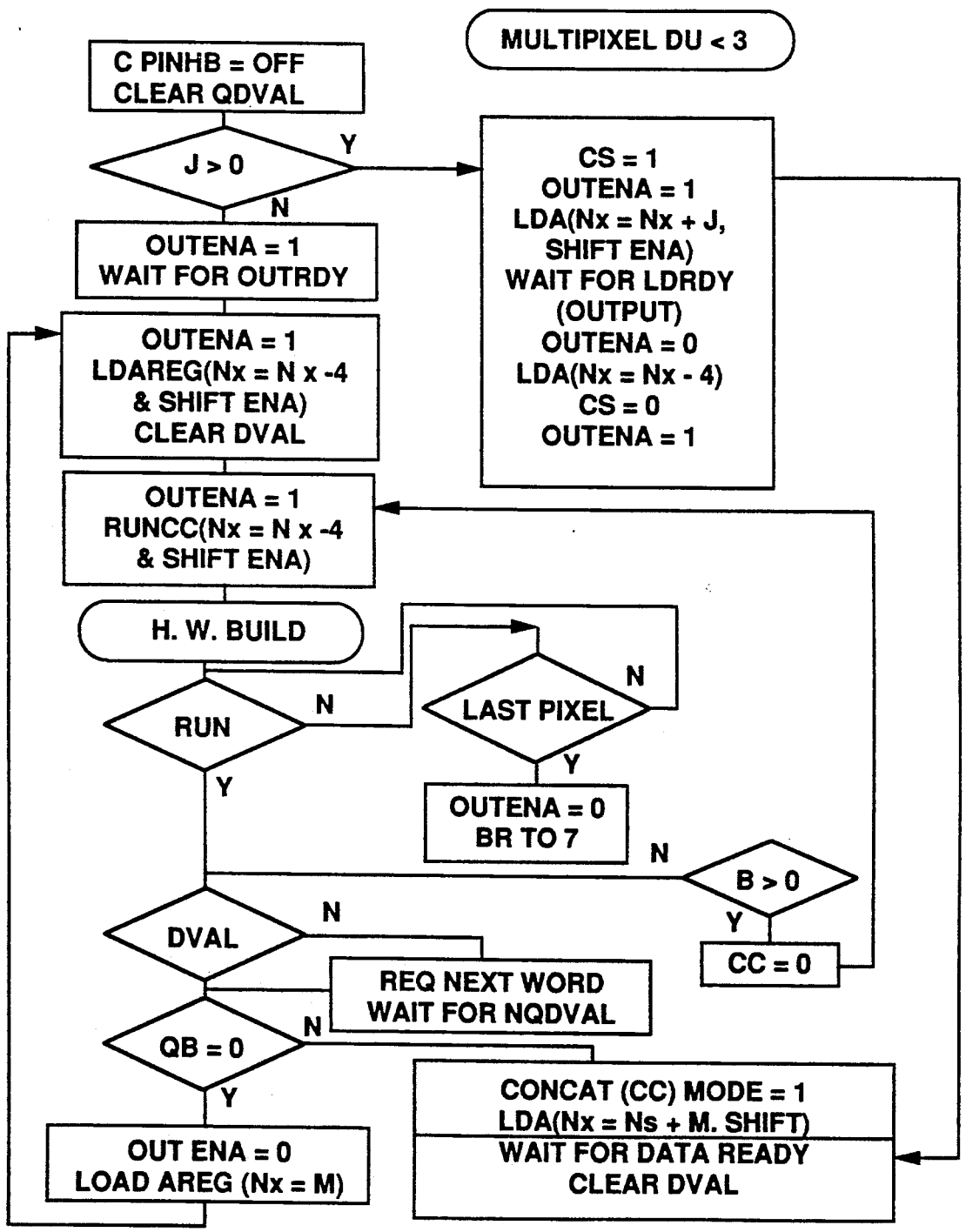
FIG. 11 shows a flow diagram illustrating the process flow for multipixel modes for $DU<3$ implemented in the pixel formatter of FIG. 6.
Figure 12:
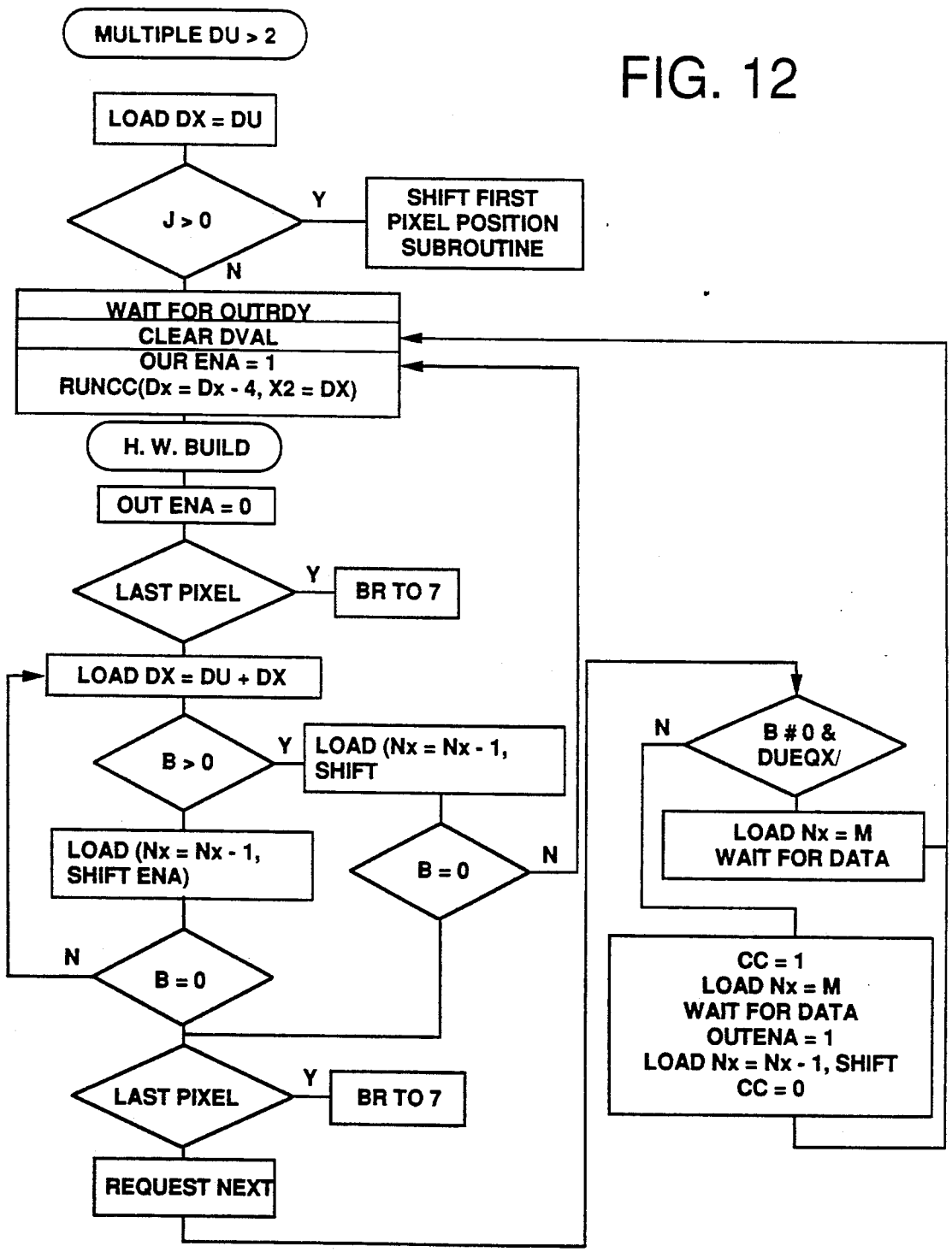
FIG. 12 shows a flow diagram illustrating the process flow for multipixel modes for $DU>2$ implemented in the pixel formatter of FIG. 6.

The multipixel build algorithms which generates stretching for DU equal to one and two is shown in FIG. 11. The multipixel algorithm generate four pixel outputs at a time. In the one and two DU modes, the stretching is minimal and several different value pixels are output at a time. The multipixel build algorithms which generates stretching for DU greater than two is shown in FIG. 12. This multipixel mode simultaneously generates stretching on adjacent pixels by a variable amount.

Figure 14:
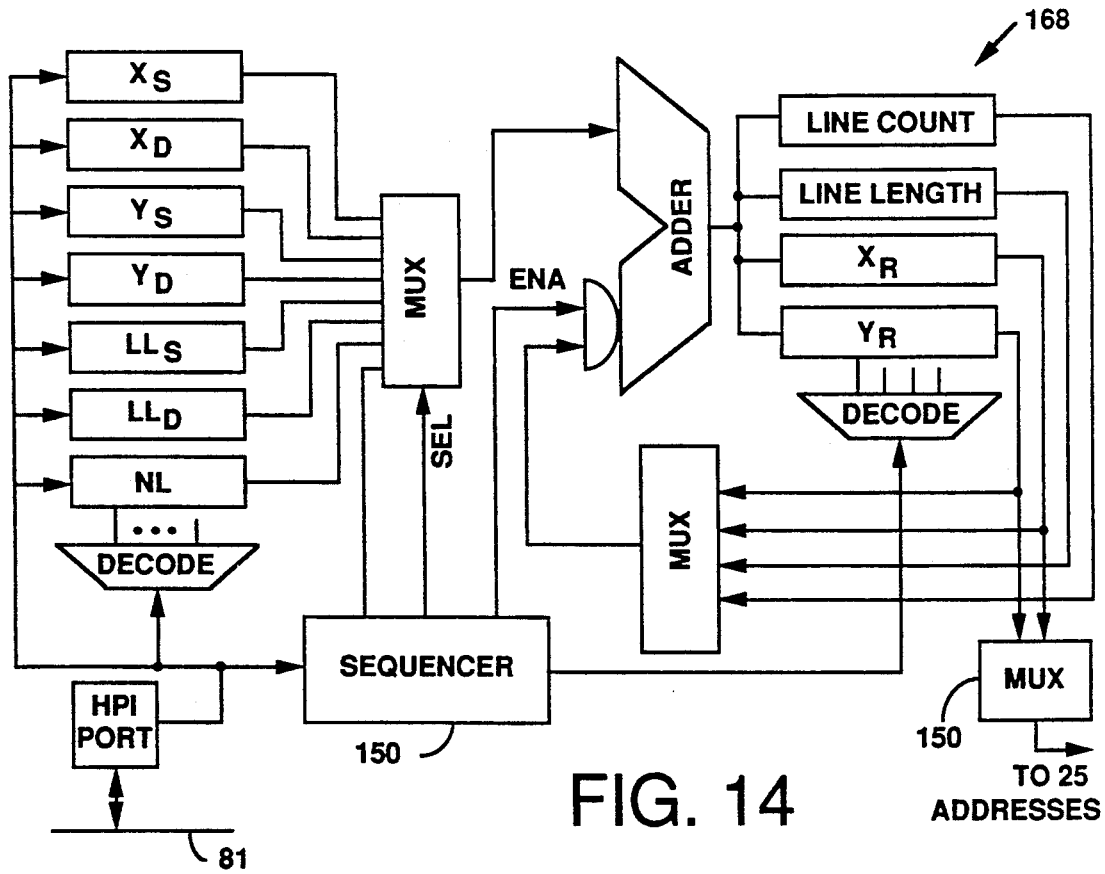
FIG. 14 shows a detailed illustration of the pixel mover of FIG. 13.
Figure 13:
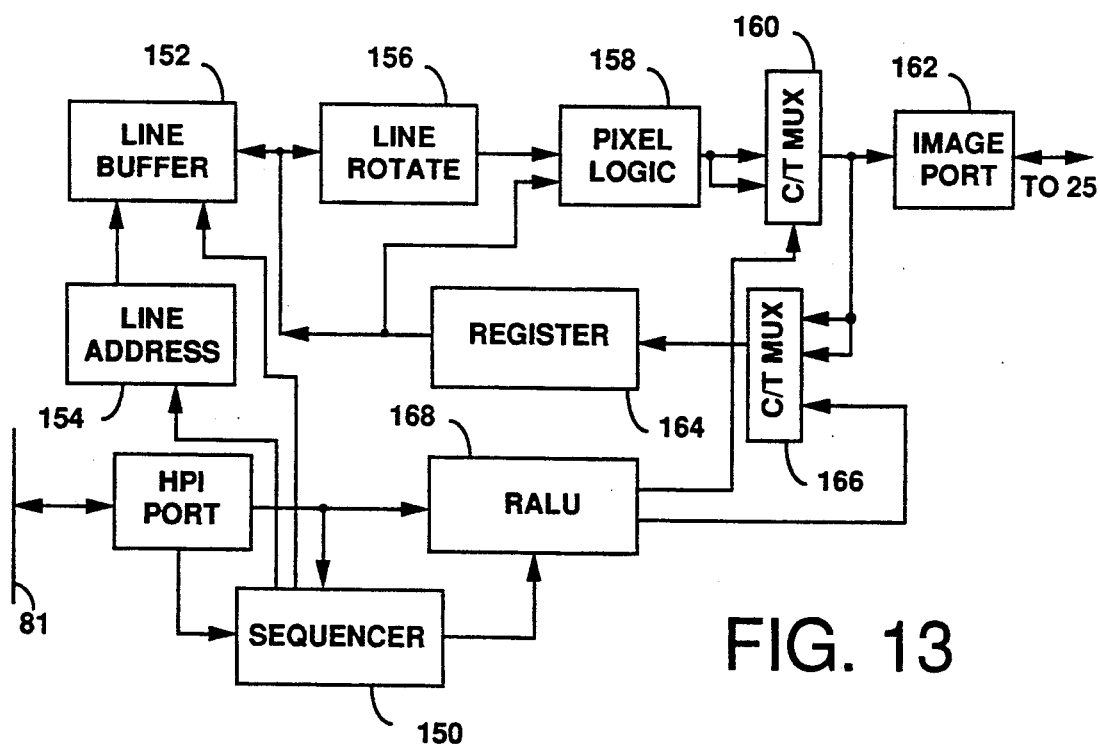
FIG. 13 shows the pixel mover of the display generator of FIG. 2.

The above-described pixel formatter 65 and the direct memory access controller 63 cooperate to perform independent transfers of several blocks of data in parallel. The pixel mover 69, however, performs a host of operations on the images stored in the bit mapped memory 25 by operating on a 4 by 4 matrix of pixels in one transfer cycle. The pixel mover 69, detailed in FIG. 13, includes a sequencer 150 which is coupled to a line buffer 152, a line address register 154 and a register arithmetic logic unit (RALU) 168. The line buffer 152 is serially coupled to line rotation logic 156, pixel logic 158, and a first corner turn multiplexer 160 that interfaces with an image bus port 162. The line buffer 152 is also coupled to a register 164 and to the pixel logic 158. The register 164 is coupled by way of a second corner turn multiplexer 166 to the image port 162. The register arithmetic logic unit 154 of the pixel mover 69 is coupled to both of the corner turn multiplexers 160, 166. The image port 162 is in turn coupled to the bit mapped memory 25 by way of the image bus. The register and arithmetic logic unit 168 is illustrated in FIG. 14. It is a programmable unit used to generate bit mapped memory addresses for source and destination based on X, Y coordinates as well as the block line and column lengths.

$X_S$, $X_D$, $Y_S$, and $Y_D$ are the source and destination X and Y coordinates of the pixel array in the bit mapped memory 25. $LL_D$ is the line length in 4 pixel blocks of the source in the bit mapped memory 25. $LL_D$ is the line length in 4 pixel blocks of the destination in the bit mapped memory 25. NL is the number of matrix lines or columns moved. Line count and line length are used to keep track of the number of lines moved and number of pixel blocks moved. The sequencer outputs or processes the required addresses or updates counters from the register file or increments them during transfer in a conventional manner.

Moving or rotating areas of an image in the bit mapped memory 25 is implemented by the pixel mover 69. This causes "waterfalling" of rasters and "reorientation" of raster pings. Waterfalling can be effected by reading image data and then writing it back horizontal or vertical strips to the bit mapped memory 25. The pixel mover 69 may blank the least significant bit, causing part of the image to be invisible. Blanking saves invisible pixels so they can be redisplayed without rebuilding the entire display. Blanking is generally employed during circular rotations.

The pixel mover 69 can make a part or parts of the moved image invisible on the screen by utilizing one bit map memory plane as a blanking plane, as is known to those in the art. By enabling or disabling the blanking plane the corresponding pixels will be made invisible or visible. When reorienting the rasters, this feature may be used so that the rasters do not have to be regenerated utilizing data from the bulk memory 19.

Figure 15:
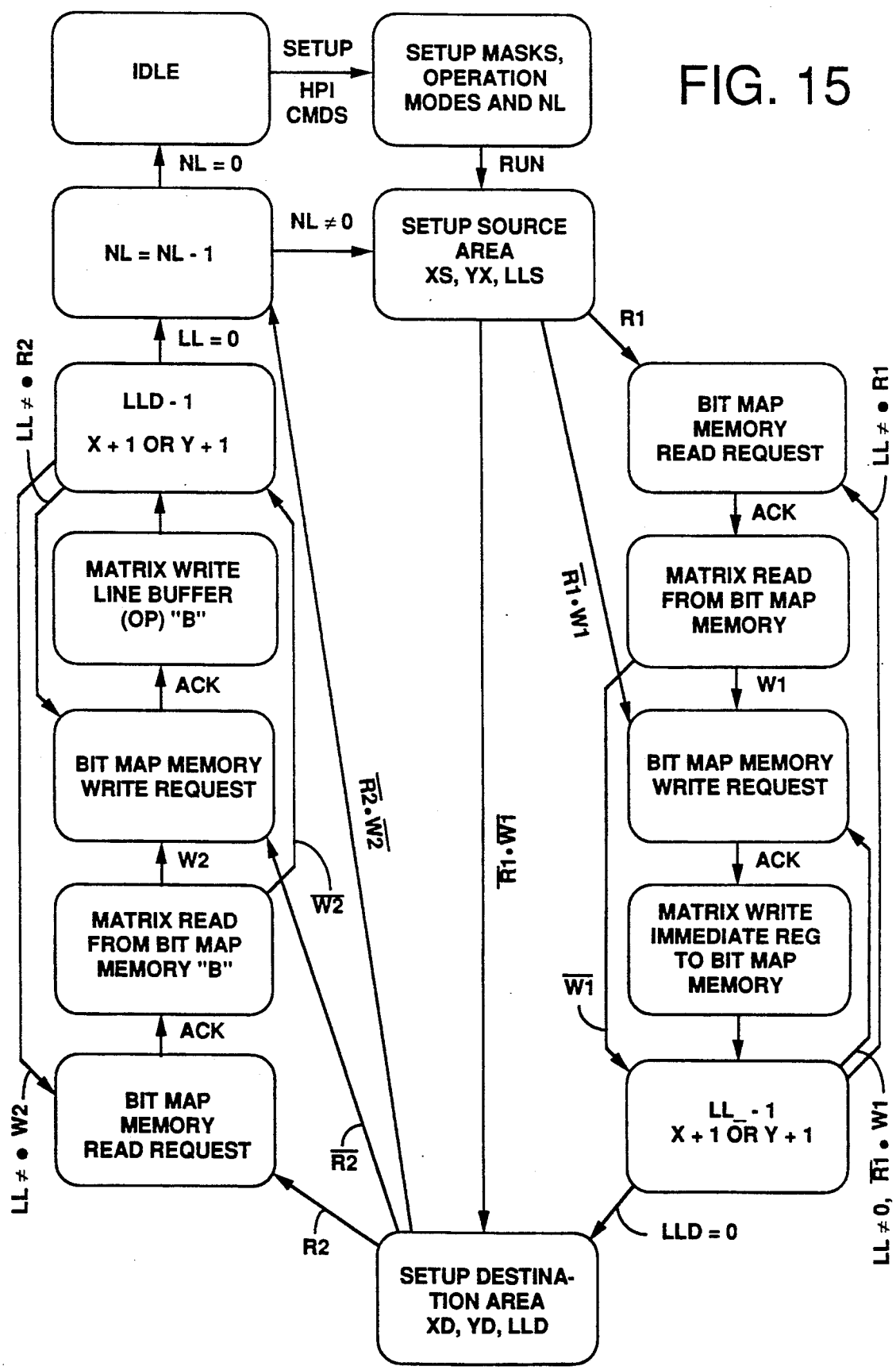
FIG. 15 is a bubble chart illustrating the operational sequences performed in the pixel mover of FIG. 13.

The basic operations of the pixel mover are illustrated in FIGS. 15 and 16a and b. FIG. 15 is a bubble chart illustrating the operations performed in the pixel mover 69. FIG. 15 shows the actual control sequence used with the programmed variables to control the pixel mover 69. Table 4 provides values for R1, R2, W1 and W2, along with transfer modes associated with each set of values.

TABLE 4

| R1 | W1 | R2 | W2 | Pixel Mover OP Codes<br>Transfer Modes |
|---|---|---|---|---|
| 0 | 0 | 0 | 0 | NOOP |
| 0 | 0 | 0 | 1 | Write only to bit map memory (BMM) from line buffer |
| 0 | 0 | 1 | 0 | Write only from BMM to line buffer |
| 0 | 0 | 1 | 1 | Read from BMM (Source), Modify, Write to BMM (Dest.) |
| 0 | 1 | 0 | 0 | Write to BMM from HPI (Source) |
| 1 | 0 | 0 | 0 | Read from BMM to HPI |
| 0 | 1 | 0 | 1 | NOOP |
| 0 | 1 | 1 | 0 | NOOP |
| 0 | 1 | 1 | 1 | NOOP |
| 1 | 0 | 0 | 1 | Read from BMM (Source), Write to BMM (Destination) |
| 1 | 0 | 1 | 0 | NOOP |
| 1 | 0 | 1 | 1 | Read from BMM (Source), Read to BMM (Destination), then perform operation on source (OP) dest, write to BMM |
| 1 | 1 | 1 | 1 | Read from BMM (Source), write back immediate register, then write results to BMM dest, write to BMM |
| 1 | 1 | 1 | 1 | Read from BMM (Source), write back immediate register, then write results to BMM dest, perform operation, write to BMM |

FIG. 16a shows the concept of moving the data within the memory, while FIG. 16b shows rotation and masking of the pixel data. FIGS. 15 and 16a and b are believed to be self explanatory, and will not be described in detail.

Thus, a display generator which constructs acoustic images in a bit mapped memory has been described which permits updating of the display without regeneration of the entire image from data stored in memory. The display generator is a parallel, pipelined, multipixel acoustic graphics processor whose manipulative components operate independently to construct and update the images in the bit mapped memory. The display generator operates on multipixel groups of signals, generally comprising raster lines and matrices of pixels. The display generator is microprogrammable, thereby enabling it to be optimized for differing application environments.

It is to be understood that the above-described embodiment is merely illustrative of one of the many specific embodiments which represent applications of the principles of the present invention. Clearly, numerous and other arrangements can be readily devised by those skilled in the art without departing from the scope of the invention.

What is claimed is:

1. A display generator which constructs and updates images in a bit mapped memory from data signals stored in a bulk memory and applied signals that are indicative of the manner in which the data signals stored are to be formatted and displayed, said display generator comprising:
   controller means for processing the applied signals and generating source and destination pixel addresses for the data signals stored in the bulk memory;
   pixel formatting means coupled to the controller means and to the bulk memory, for utilizing the source addresses generated by the controller means to read the data signals from the bulk memory, for processing multipixel two dimensional groups of the data signals to format them into predetermined display formats, and for transferring the formatted signals to the bit mapped memory in accordance with the destination addresses generated by the controller means; and pixel manipulation means coupled to the bit mapped memory for independently processing two dimensional arrays of signals located in selected areas of the image stored in the bit mapped memory to reformat those selected areas without regenerating individual pixels from the bulk memory, said pixel manipulation means including a sequencer for sequencing the operations of the pixel manipulation means;

rotation and corner turning means for manipulating matrices of pixels to update selected areas of the image stored in the bit mapped memory; and register and arithmetic logic means coupled to the sequencer for responding to signals provided thereby and coupled to the rotation and corner turning means for processing bit mapped memory addresses, line buffer addresses, block lengths and boundary masks for use in manipulating the matrices of pixels.

2. The display generator of claim 1 wherein said pixel manipulation means comprises:

means for processing a two dimensional matrix comprising 16 pixels stored in the bit mapped memory and manipulating the orientation of the two dimensional matrix to update a selected area of the bit mapped memory.

3. The display generator of claim 1 wherein said controller means comprises:

address generation means for generating multipixel addresses for use by the pixel formatter means in formatting the data signals; and microsequencer and microprogram memory means comprising a control algorithm processor coupled to the address generation means for providing initialization and command interpretation functions.

4. The display generator of claim 1 wherein said pixel formatting means comprises:

a line buffer for processing a plurality of raster lines of data signals;

algorithm processor means for controlling the reorientation of pluralities of pixels in accordance with a predetermined sequence of instructions; and pixel processing means coupled between the line buffer and the algorithm processor means for expanding, compressing and rotating groups of pixels under control of the algorithm processor means.

5. A display generator for use with a system which processes acoustic sensor signals stored in a bulk memory and constructs acoustic images i a bit mapped memory prior to their transfer to a raster-type display, said display generator formatting the acoustic signals from a predetermined format into a plurality of predetermined display formats, said display generator comprising:

controller means for processing applied signals which are indicative of the manner in which data signals stored in a bulk memory are to be formatted and displayed, and for generating source and destination pixel addresses for the data signals;

raster line processing means coupled to the controller means and to the bulk memory, for processing raster lines of the data signals in accordance with signals provided by the controller means, for utilizing the source addresses generated by the controller means to read the raster lines of data signals from the bulk memory which are to be formatted, for formatting the data signals into predetermined display formats, and for transferring the formatted signals to the bit mapped memory in accordance with the destination addresses generated by the controller means; and pixel manipulation means coupled to the bit mapped memory for independently processing two dimensional arrays of signals located in selected areas of the image stored in the bit mapped memory to reformat those selected areas without regenerating individual pixels from the bulk memory, said pixel manipulation means including a sequencer for sequencing the operations of the pixel manipulation means, register and arithmetic logic means coupled to the sequencer for processing bit mapped memory addresses, line buffer addresses, block lengths and boundary masks for use in manipulating the matrices of pixels, and rotation and corner turning means for manipulating matrices of pixels to update selected areas of the image stored in the bit mapped memory.

6. The display generator of claim 5 which further comprises memory interface means coupled to the bit mapped memory, the controller means and the pixel formatting means for coupling formatted signals from the pixel formatting means to the bit mapped memory.

7. The display generator of claim 5 wherein said controller means comprises:

address generation means for generating pixel addresses for use by the pixel formatter means and addresses for use by the pixel manipulation means in formatting the data signals;

a register and arithmetic logic unit; and a microsequencer and microprogram memory coupled to the address generation means comprising a control algorithm processor that provides for display generator initialization and command interpretation.

8. The display generator of claim 5 wherein said pixel formatting means comprises:

a two-line line buffer for processing blocks of raster line data signals;

algorithm processor means for controlling the reorientation of pluralities of pixels in accordance with a predetermined sequence of instructions; and pixel manipulation means coupled between the line buffer and the algorithm processor means for expanding, compressing and rotating groups of pixels under control of the algorithm processor means.

* * * * *